United States Patent
Agneeswaran et al.

(10) Patent No.: US 8,930,731 B2
(45) Date of Patent: Jan. 6, 2015

(54) REDUCING POWER CONSUMPTION IN DATA CENTERS HAVING NODES FOR HOSTING VIRTUAL MACHINES

(75) Inventors: Vijay Srinivas Agneeswaran, Bangalore (IN); Hariprasad Nellitheertha Venkataraja, Bangalore (IN); Harish Chauhan, Bangalore (IN); Sharad Satender Lal, Bangalore (IN)

(73) Assignee: Oracle International Corporation, Redwood Shores, CA (US)

( * ) Notice: Subject to any disclaimer, the term of this patent is extended or adjusted under 35 U.S.C. 154(b) by 1183 days.

(21) Appl. No.: 12/506,277

(22) Filed: Jul. 21, 2009

(65) Prior Publication Data

US 2011/0022861 A1    Jan. 27, 2011

(51) Int. Cl.
G06F 1/32 (2006.01)
G06F 9/455 (2006.01)
G06F 9/50 (2006.01)

(52) U.S. Cl.
CPC ............ *G06F 1/3203* (2013.01); *G06F 1/3287* (2013.01); *G06F 9/5077* (2013.01); *G06F 9/5094* (2013.01); *Y02B 60/1278* (2013.01); *Y02B 60/1282* (2013.01); *Y02B 60/167* (2013.01); *Y02B 60/142* (2013.01)
USPC .............................................. 713/320; 718/1

(58) Field of Classification Search
CPC ..................... G06F 9/5027; G06F 9/05–9/61
USPC ........................................ 713/300, 310, 320
See application file for complete search history.

(56) References Cited

U.S. PATENT DOCUMENTS

| | | | |
|---|---|---|---|
| 7,225,441 B2 | 5/2007 | Kozuch et al. | |
| 7,577,722 B1 * | 8/2009 | Khandekar et al. | 709/220 |
| 7,925,923 B1 * | 4/2011 | Hyser et al. | 714/13 |
| 7,971,078 B2 * | 6/2011 | Govindan et al. | 713/300 |
| 2005/0060590 A1 | 3/2005 | Bradley et al. | |
| 2008/0104587 A1 | 5/2008 | Magenheimer et al. | |
| 2008/0201591 A1 | 8/2008 | Hu et al. | |
| 2009/0119664 A1 * | 5/2009 | Pike et al. | 718/1 |

OTHER PUBLICATIONS

"Active Power Management", "http://www.cassatt.com/sltn_power_mgmt.htm", Downloaded Circa: Nov. 28, 2008, pp. 1-1.

Ripal Nathuji and Karsten Schwan, "Virtualpower: Coordinated Power Management in Virtualized Enterprise Systems", "SOSP", Dated: Oct. 14-17, 2007, pp. 1-14.

(Continued)

*Primary Examiner* — Kim Huynh
*Assistant Examiner* — Eric Chang
(74) *Attorney, Agent, or Firm* — Narendra Reddy Thappeta

(57) ABSTRACT

According to an aspect of the present invention, nodes for hosting of new virtual machines (VM) are selected according to approaches designed to reduce power consumption in a grid. In an embodiment, the approaches are designed to facilitate the possibility of freeing one or more nodes from hosting VMs to power down the nodes, thereby reducing power consumption. Thus, an example approach is based on provisioning a new VM on a node which currently (immediately prior to provisioning) has the maximum resource consumption. Another example approach is based on provisioning a new VM on a node which currently has small-sized VMs in terms of resource requirements. In yet another embodiment, the approach is based on provisioning a new VM on a node located in a geographical area having low power tariffs.

15 Claims, 8 Drawing Sheets

(56) References Cited

OTHER PUBLICATIONS

"Livepower", "http://www.virtualization.info/2008/08/virtual-iron-competes-with-vmware-on.html", Downloaded Circa: Nov. 28, 2008, pp. 1-2.

Andrzej Kochut and Kirk Beaty, "On Strategies for Dynamic Resource Management in Virtualized Server Environments", "15th International Symposium on Modeling, Analysis, and Simulation of Computer and Telecommunication Systems", Publication Date: Oct. 24-26, 2007, pp. 193-200, ISBN: 978-1-4244-1853-4.

Ramya Raghavendra et. al., "No "Power" Struggles: Coordinated Multi-Level Power Management for the Data Center", Year of Publication: 2008, pp. 48-59, ISBN: 978-1-59593-958-6, ASPLOS'08 Mar. 1-5, 2008.

"Oracle VM FAQ", pp. 1-5, Dated: Oct. 2008.

* cited by examiner

FIG. 4A

| Node | Current VMs | Resources Consumed |
|---|---|---|
| 140A | 401 | 20% |
| | 402 | 20% |
| | 403 | 30% |
| | 404 | 10% |
| 140B | 411 | 5% |
| 140Z | 421 | 20% |
| | 422 | 10% |
| | 423 | 30% |

FIG. 4B

| Node | Current VMs | Resources Consumed |
|---|---|---|
| 140A | 401 | 20% |
| | 402 | 20% |
| | 403 | 30% |
| | 404 | 10% |
| | 405 | 10% |
| 140B | 411 | 5% |
| 140Z | 421 | 20% |
| | 422 | 10% |
| | 423 | 30% |

FIG. 4C

| Node | Current VMs | Resources Consumed |
|---|---|---|
| 140A | 401 | 20% |
| | 402 | 20% |
| | 403 | 30% |
| | 404 | 10% |
| | 405 | 10% |
| | 411 | 5% |
| 140B | None | 0%(Shut Down) |
| 140Z | 421 | 20% |
| | 422 | 10% |
| | 423 | 30% |

FIG. 5A

| Node | Current VMs | Resources Consumed |
|---|---|---|
| 140A | 501 | 10% |
|  | 502 | 10% |
|  | 503 | 10% |
|  | 504 | 10% |
| 140B | 511 | 40% |
|  | 512 | 50% |
| 140Z | 521 | 40% |

FIG. 5B

| Node | Current VMs | Resources Consumed |
|---|---|---|
| 140A | 501 | 10% |
|  | 502 | 10% |
|  | 503 | 10% |
|  | 504 | 10% |
|  | 505 | 10% |
| 140B | 511 | 40% |
|  | 512 | 50% |
| 140Z | 521 | 40% |

FIG. 5C

| Node | Current VMs | Resources Consumed |
|---|---|---|
| 140A | None | 0% (Shut Down) |
| 140B | 511 | 40% |
|  | 512 | 50% |
|  | 521 | 40% |
| 140Z | 505 | 10% |
|  | 501 | 10% |
|  | 502 | 10% |
|  | 503 | 10% |
|  | 504 | 10% |

| Node | Location | Tarrif | Current VMs | Resources Consumed |
|---|---|---|---|---|
| 140A | PP | 5 | 601 | 10% |
| | | | 602 | 20% |
| | | | 603 | 20% |
| | | | 604 | 10% |
| 140B | PP | 5 | 611 | 40% |
| | | | 612 | 50% |
| 140Z | QQ | 1 | 621 | 20% |

*FIG. 6A*

| Node | Location | Tarrif | Current VMs | Resources Consumed |
|---|---|---|---|---|
| 140A | PP | 5 | 601 | 10% |
| | | | 602 | 20% |
| | | | 603 | 20% |
| | | | 604 | 10% |
| 140B | PP | 5 | 611 | 40% |
| | | | 612 | 50% |
| 140Z | QQ | 1 | 621 | 20% |
| | | | 605 | 10% |

| Node | Customer | Number of VMs per customer | | |
|---|---|---|---|---|
| | | Mar-Jun | Jul-Nov | Dec-Feb |
| 140A | C1 | 25 | 26 | 5 |
| 140B | C2 | 16 | 14 | 13 |
| 140Z | C3 | 9 | 15 | 19 |

FIG. 7B

| Node | Customer | Number of VMs per customer | | |
|---|---|---|---|---|
| | | Mar-Jun | Jul-Nov | Dec-Feb |
| 140A | | 25 | 26 | 0 |
| 140B | C2 | 16 | 14+1 | 13+1 |
| 140Z | C3, C1 | 9 | 15 | 19+5 |

REDUCING POWER CONSUMPTION IN DATA CENTERS HAVING NODES FOR HOSTING VIRTUAL MACHINES

BACKGROUND OF THE INVENTION

1. Technical Field

The present disclosure relates to distributed computing systems and more specifically to reducing power consumption in a data center having nodes for hosting virtual machines (VM).

2. Related Art

Data centers house computer systems, which are also referred to as nodes. Data centers may also house various other equipment required to operate the nodes and to provide communication capability. Examples of such equipment include telecommunication equipment (routers, switches, etc.), storage systems, power supplies, etc. In particular, the power supplies provide the necessary electrical power for the operation of the nodes and other equipments at the data centers.

Virtual machines (VMs) often form the basis for executing various user applications. As is well known, a virtual machine may be viewed as a container in which user applications are executed. A node can host multiple virtual machines, and the virtual machines provide a view of a complete machine (computer system) to the user applications executing in the virtual machine. Thus, when multiple VMs are hosted on a single node, the memory and processing resources (of the node) are shared by the VMs.

It may be desirable to reduce power consumption in a data center containing nodes hosting the VMs.

BRIEF DESCRIPTION OF THE DRAWINGS

Example embodiments of the present invention will be described with reference to the accompanying drawings briefly described below.

FIGS. 4A, 4B and 4C are diagrams depicting the contents of a table stored in a scheduler in an embodiment of the present invention.

FIGS. 5A, 5B and 5C are diagrams depicting the contents of a table stored in a scheduler in an alternative embodiment of the present invention.

FIGS. 6A and 6B are diagrams depicting the contents of a table stored in a scheduler in yet another embodiment of the present invention.

FIGS. 7A and 7B are diagrams depicting the contents of a table stored in a scheduler in yet another embodiment of the present invention.

In the drawings, like reference numbers generally indicate identical, functionally similar, and/or structurally similar elements. The drawing in which an element first appears is indicated by the leftmost digit(s) in the corresponding reference number.

DETAILED DESCRIPTION OF THE INVENTION

1. Overview

An aspect of the present invention selects nodes for provisioning of new virtual machines (VM) according to approaches designed to reduce power consumption in a grid. Thus, when a new VM is to be created in the grid, the specific machine on which to host the new VM is selected, is determined to reduce power consumption.

In an embodiment, the approaches are designed to facilitate the possibility of freeing one or more nodes from hosting VMs to thereafter power down the nodes, thereby reducing power consumption. Thus, an example approach is based on provisioning a new VM on a node which currently (at a time node selection is to be performed) has the maximum resource consumption.

Another example approach is based on selecting nodes, which currently (at a time the node is to be selected) have smaller-sized VMs in terms of resource requirements, with a correspondingly higher probability. Thus, a node having smallest sized VMs may be chosen as a suitable node to provision (and thus host) a new VM.

In another embodiment, the approach is based on selecting a node located in a geographical area having lower power tariffs, with a correspondingly higher probability. Thus, assuming a grid spans multiple data centers located in different geographical areas, a node located in lower tariff areas may be selected for hosting of the new VM.

Several aspects of the present invention are described below with reference to examples for illustration. However, one skilled in the relevant art will recognize that the invention can be practiced without one or more of the specific details or with other methods, components, materials and so forth. In other instances, well-known structures, materials, or operations are not shown in detail to avoid obscuring the features of the invention. Furthermore, the features/aspects described can be practiced in various combinations, though only some of the combinations are described herein for conciseness.

2. Example Environment

Figure 1:
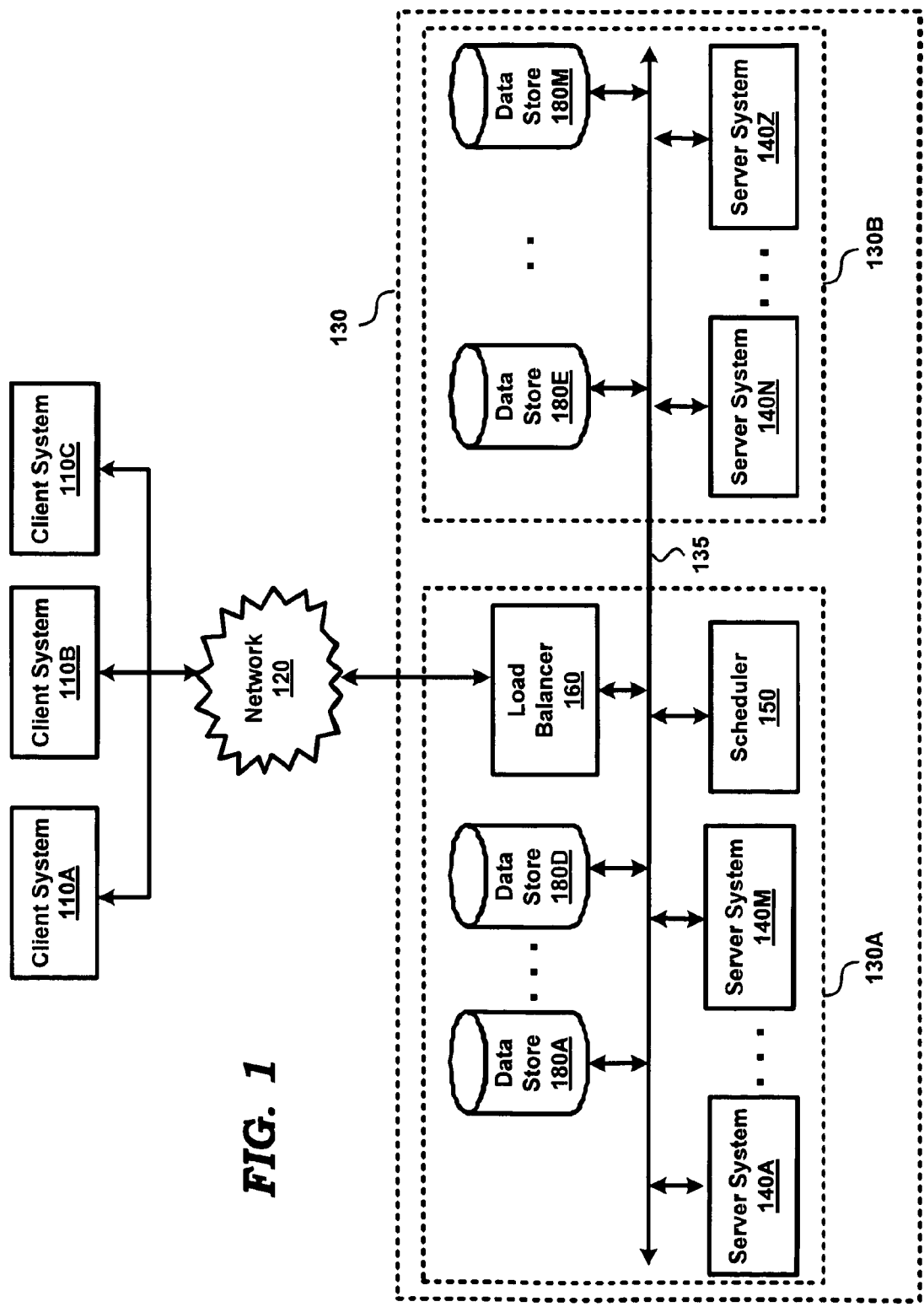
FIG. 1 is a block diagram illustrating an example environment in which several aspects of the present invention can be implemented.

FIG. 1 is a block diagram illustrating an example environment in which several aspects of the present invention can be implemented. The block diagram is shown containing client systems 110A-110C, network 120, and cluster/grid 130. Grid 130 is shown containing data centers 130A and 130B. Data center 130A is shown containing server systems 140A-140M, scheduler 150, load balancer 160, and data stores 180A-180D, while data center 130B is shown containing server systems 140N-140Z and data stores 180E-180M.

Data centers 130A and 130B may be physically located in different geographical locations, for example, in different cities. Systems in data centers 130A and 130B may operate in conjunction as a single server/system in providing services. In other words, users using client systems 110A-110C view data centers 130A and 130B as a single system offering specific desired services (without being concerned about the specific individual nodes in the cluster).

Merely for illustration, only representative number/type of data centers and systems within the data centers is shown in FIG. 1. Many environments often contain many more data centers, in turn containing many more systems, both in number and type, and located geographically separately (but connected with each other via corresponding communication paths), depending on the purpose for which the environment is designed. Each system/device of FIG. 1 is described below in further detail.

Communication path 135 contains both local area network (LAN) to provide connectivity among digital systems within a data center, as well as (high speed) path between data centers. Thus, components/nodes in each of data centers 130A and 130B may communicate with each other internally within the data centers as well as with components/nodes in the other data center. Due to such connectivity, a cluster may span multiple data centers, while providing a desired high throughput performance.

Network 120 provides connectivity between client systems 110A-110C and grid 130. Network 120 may be implemented using protocols such as Transmission Control Protocol (TCP) and/or Internet Protocol (IP), well known in the relevant arts. In general, in TCP/IP environments, a TCP/IP packet is used as a basic unit of transport, with the source address being set to the TCP/IP address assigned to the source system from which the packet originates and the destination address set to the TCP/IP address of the target system to which the packet is to be eventually delivered.

Each of client systems 110A-110C represents a system such as a personal computer, workstation, mobile station, etc., used by users to generate (client) requests to enterprise applications/softwares (user applications) executed in virtual machines in server systems/nodes in grid 130. The requests (for using specific services provided by the VMs) may be generated using appropriate user interfaces. In general, a client system requests an application/software in a VM for performing desired tasks/services and receives corresponding responses containing the results of performance/processing of the requested tasks/services.

Load balancer 160 forwards client requests (received via network 120) to a corresponding VM in (a node) in grid 130, and may maintain information internally indicating which of the VMs in server systems 140A-140M and 140N-140Z is currently available/ready for processing user requests (directed to a specific user application). The selection of the specific node to service a client request is generally designed to minimize the response time to the request, and may be performed using any of several well-known techniques. In one embodiment, load balancer 160 receives TCP/IP packets (corresponding to the user requests) that have destination address equal to the IP address of the load balancer, and forwards each request in a packet having the IP address of the respective node (executing the specific application instances in a corresponding VM) as the destination IP address.

Some of the typical nodes in grid 130, such as data stores, server systems, and scheduler as relevant to the understanding of the present invention are described in detail below. However, grid 130 may contain more types and/or number (typically, in thousands) of nodes across multiple data centers, as will be apparent to one skilled in the relevant arts by reading the disclosure provided herein.

Each of data stores 180A-180D represents a non-volatile storage facilitating storage and retrieval of a collection of data by one or more enterprise applications/softwares executing in data center 130A, in particular in server systems 140A-140M (typically while processing various client/user requests). Similarly, each of data stores 180E-180M represents a non-volatile storage facilitating storage and retrieval of a collection of data by one or more enterprise applications/softwares executing in data center 130B.

Some of the data stores may be implemented using relational database technologies and therefore provide storage and retrieval of data using structured queries such as SQL (Structured Query Language). Other data stores may be implemented as file stores providing storage and retrieval of data in the form of one or more files organized as one or more directories, as is well known in the relevant arts.

Each of server systems 140A-140M and 140N-140Z hosts virtual machines (VM), which in turn execute application instances, designed to process client requests. Each application instance is implemented with the program logic to process the corresponding client request. It should be appreciated that the same application type (e.g., a payroll management application) is often executed as multiple instances (typically on different servers, but multiple instances can be executed in the server, but on different VMs) for reasons such as scalability, partitioning by different customer entities, etc.

Scheduler (also termed grid resource manager) 150 schedules provisioning/termination of VMs on corresponding nodes, typically consistent with the load and service level expectations set with the customers. Once a user application is available (or terminated) on a corresponding VM, the corresponding node/VM/user application information may be communicated to the load balancer thereafter.

Although only a single scheduler (150) is shown in FIG. 1, multiple (cooperative) instances of scheduler 150 may be executed, for example one each in each of data centers 130A and 130B. In such a scenario, each of the instances may communicate with each other via path 135 to perform the operations noted above in a coordinated fashion.

In particular, scheduler 150 may determine the specific one of server systems (140A-140M and 140N-140Z) in which to host new VMs. In addition, scheduler 150 may also cause the movement/migration of 'currently hosted' VMs from one server system to another. Accordingly, scheduler 150 may maintain information specifying the VMs currently hosted in each of server systems 140A-140M and 140N-140Z, the resources (in terms of percentage of CPU/processor time usage and memory requirements) consumed by each VM, and the amount of unused/free resources currently available in each server system, as illustrated with respect to FIG. 2.

Figure 2:
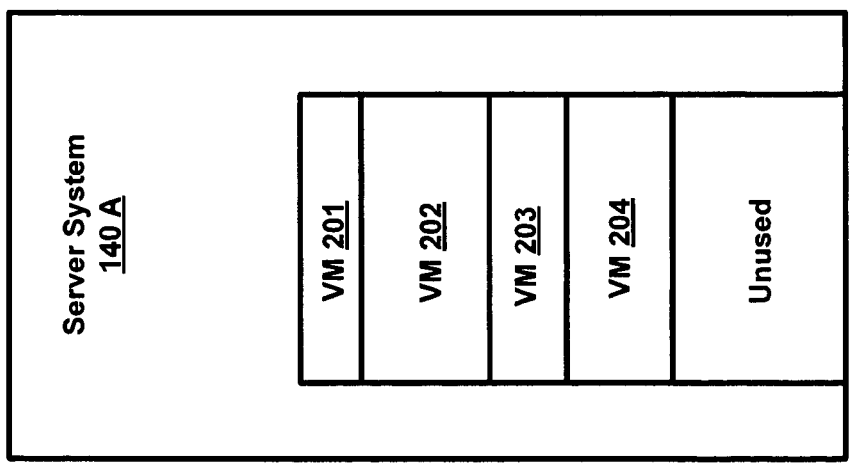
FIG. 2 is a diagram illustrating example VMs hosted in a node.

FIG. 2 illustrates an example state of server system 140A, shown 'currently' hosting VMs 201, 202, 203 and 204, with some resources still remaining 'unused'. Scheduler 150, may thus, maintain information that VMs 201, 202, 203 and 204 are hosted on server system 140A, as well as the resources currently consumed by each of the VMs. Scheduler 150 may also maintain information specifying the amount of 'unused' resources currently available in server system 140A, which may be used to determine whether a new VM can be hosted in server system 140A or not. In an embodiment, the resources include a number of processors and memory space. The processors may be shared across VMs, but the memory space is dedicated to (not shared among) specific VMs.

As noted above, it may be desirable to reduce power consumption in grid 130, and scheduler 150 may be used for such an objective, as described next.

3. Reducing Power Consumption

Figure 3:
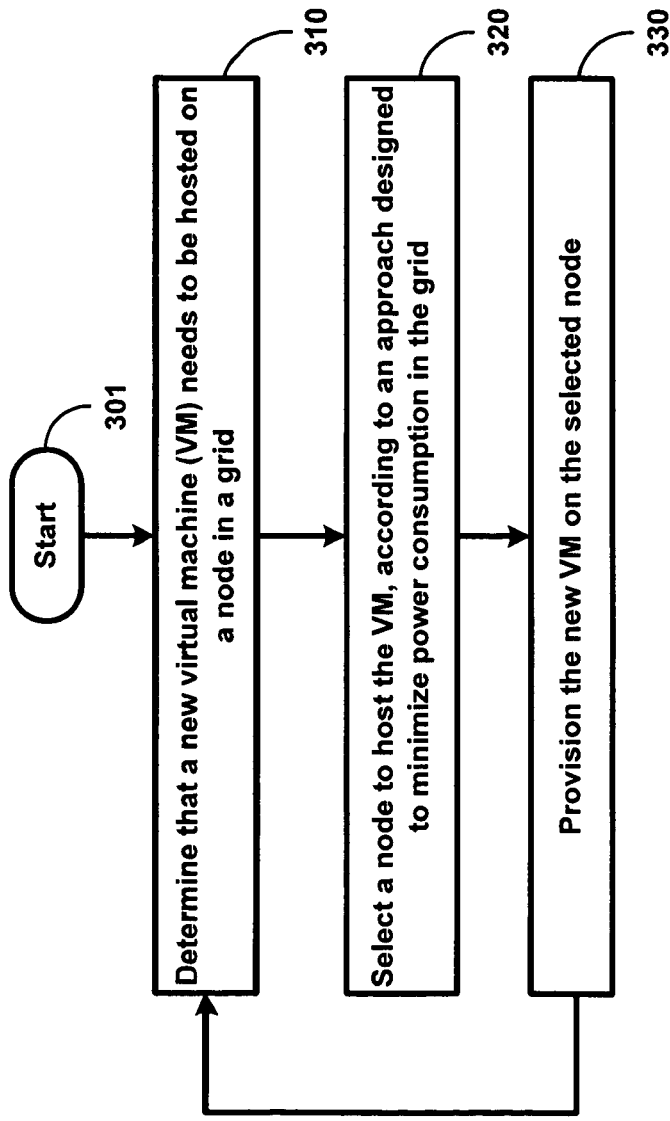
FIG. 3 is a flow chart illustrating the manner in which power consumption in a data center hosting VMs is reduced, according to an aspect of the present invention.

FIG. 3 is a flow chart illustrating the manner in which power consumption in a data center hosting VMs is reduced according to an aspect of the present invention. The flowchart is described with respect to FIGS. 1 and 2, and in relation to scheduler 150 merely for illustration. However, the features can be implemented in other environments also without departing from the scope and spirit of various aspects of the present invention, as will be apparent to one skilled in the relevant arts by reading the disclosure provided herein.

In addition, some of the steps may be performed in a different sequence than that depicted below, as suited to the specific environment, as will be apparent to one skilled in the relevant arts. Many of such implementations are contemplated to be covered by several aspects of the present invention. The flow chart begins in step 301, in which control immediately passes to step 310.

In step 310, scheduler 150 determines that a new virtual machine (VM) needs to be hosted on a node in grid 130. Scheduler 150 may make such a determination, for example, based on load information (number of requests being received for processing by respective user application types, etc.) received from load balancer 160, the SLA with the respective customers, etc. As is well known, an SLA (service level agreement) may be based on a combination of a number of VMs to be hosted, resources to be allocated, etc., in specified duration. A new VM implies that a VM, in addition to those already hosted, is to be provisioned. Thus, a new VM is generally needed when there is an enhanced load (number of requests) or SLA otherwise requires an additional VM. Control then passes to step 320.

In step 320, scheduler 150 selects a node to host the VM, according to an approach designed to minimize power consumption in grid 130. In addition, scheduler 150 may also ensure that the selection of the node is consistent with the resource requirements of the new VM. Thus, when there are multiple nodes on which a new VM may be hosted, a node is selected to minimize power consumption in grid 130. Control then passes to 330.

In step 330, scheduler 150 provisions the new VM on the selected node. Provisioning implies creation of the VM on the selected node and entails tasks such as execution of the appropriate executable modules and any needed configurations, to cause the new VM to be hosted on the selected node. Such provisioning may be implemented in a known way. Control then passes to step 310, in which scheduler 150 receives another request for hosting another (new) VM, and the corresponding steps of the flowchart may be repeated.

Thus, according to an aspect of the present invention, the goal of minimization of power consumption is considered at the time of provisioning of a new VM itself. As a result, the aggregate power requirements in operation of grid/data centers, may be reduced. Such a requirement may be increasingly critical as the scale/size of the clusters (or data centers) increases.

The operations of the flowchart described above are illustrated next with some example approaches designed to minimize power consumption. In the example approaches illustrated below, it is assumed for convenience of description that only server systems 140A, 140B and 140Z (of FIG. 1) are present in grid 130. It is also assumed that each of nodes 140A, 140B, and 140Z provides an equal amount of resources. It is understood that when the resources provided by the nodes are unequal, corresponding computations based on the actual amount of resources can be made to enable making a decision as to which node to provision the new VM in.

4. Hosting a New VM Based on Current Resource Consumption in Nodes

According to an aspect of the present invention, hosting of a new VM is based on a determination of resources currently consumed in nodes by 'currently' hosted VMs. FIGS. 4A-4C illustrate an example approach to power reduction according to such a technique. In the examples, merely for ease of understanding, a single number (resources consumed) representing resources consumed is shown. However, the approach may be extended multiple resources (e.g., containing at least memory required and processing resources required), as will be apparent to one skilled in the relevant arts by reading the disclosure provided herein.

FIG. 4A shows a table maintained in scheduler 150 with the contents of the table specifying information (immediately) prior to scheduler 150 determining that a new VM needs to be provisioned. Four VMs 401, 402, 403 and 404, each respectively consuming 20%, 20%, 30% and 10% of the resources (processing power and memory) of node 140A, are assumed to be currently hosted in node 140A. Node 140B hosts VM 411, which consumes 5% of the resources of node 140B. Node 140Z hosts VMs 421, 422 and 423, respectively consuming 20%, 10% and 30% of the resources of node 140Z.

Assume now that scheduler 150 needs to provision a new VM (VM 405) in one of nodes 140A, 140B and 140Z, and that node 405 requires 10% of the resources of a node (any of nodes 140A, 140B and 140Z). Each of nodes 140A, 140B and 140Z has the 10% resource requirement needed to be provided for the new VM 405. However, node 140A currently has the maximum resource consumption (20+20+30+10=80%), while also having sufficient resources for the new VM 405. Hence, scheduler 150 provisions new VM 405 in node 140A, as shown in the table of FIG. 4B.

The approach maximizes the probability that a node currently with only minimal resource consumed (node 140B in the example) may be freed from hosting VMs, for example, by deactivation or migration of one or more VMs (VM 411 in the example) to another node at a subsequent time instance, thereby permitting node 140B to be shutdown (at least temporarily, till its resources are subsequently required for hosting other VMs), and hence reducing reduction of power in grid 130. As shown in FIG. 4C, VM 411 is migrated at a subsequent instance of time to node 140A, thereby allowing node 140B to be shut down to reduce power.

It may be appreciated that the approach illustrated above provisions a new VM in a node that currently (just prior to provisioning) has the maximum resource utilization, provided that the node has sufficient resources to be allocated for the new VM. In addition, migration of a VM from one node to another may also be based on a similar approach, i.e., a VM is migrated to a node with currently higher resource consumption rather than to a node with currently lesser resource consumption.

5. Hosting a New VM Based on Size of VMs in Nodes

According to another aspect of the present invention, hosting of a new VM is based on the sizes (extent of resources consumed) of currently-hosted VMs in nodes. In an embodiment, scheduler 150 selects a node hosting VMs which are small and like-sized in terms of resource consumption for hosting a new VM. FIG. 5A shows the contents (entries) of a table maintained in scheduler 150 prior to scheduler 150 determining that a new VM needs to be provisioned. Four VMs 501, 502, 503 and 504 each consuming 10% of the resources of node 140A are assumed to be currently hosted in node 140A. Node 140B hosts VMs 511 and 512 respectively consuming, 40% and 50% of the resources of node 140B. Node 140Z hosts VMs 521 consuming 40% of the resources of node 140Z.

Assume now that scheduler 150 needs to host a new VM (VM 505) in one of nodes 140A, 140B and 140Z, and that node 405 requires 10% of the resources of a node (any of nodes 140A, 140B and 140Z). Each of nodes 140A, 140B and 140Z has the 10% resource requirement needed to be provided for the new VM 505.

However, node 140A currently has VMs each of which consumes the least amount of resources (i.e., smallest-sized VMs) as well as are similar/like-sized in terms of resource consumption, with each of the VMs consuming the same amount (10%) of the resources. Node 140A also has sufficient resources (the required 10%) for the new VM 405. Hence, scheduler 150 provisions new VM 505 in node 140A, as shown in the table of FIG. 5B.

The approach is based on the premise that VMs which need minimal (and like-sized) resources can, at a future point in time, be more easily migrated to another node than VMs with larger resource requirements. As an illustration, the possibility of migrating VMs 511 and 512 (with 40% and 50% resource requirements respectively) to a different node (with the aim of shutting down node 140B) might be less compared to the possibility of migrating the 'smaller' VMs in node 140A to another node.

As shown in FIG. 5C, VMs 501, 502, 503, 504 and 505 are each migrated at subsequent instances of time to node 140Z, thereby allowing node 140A to be shut down to reduce power.

It is noted that the technique of FIGS. 5A, 5B and 5C may be applied in combination with that of FIGS. 4A, 4B and 4C, based for example on a computation of the probability that each of the techniques provides that a node may eventually be freed from hosting VMs. In such a combined technique, the probability provided by each individual approach of freeing a node of VMs may be computed prior to each decision of provisioning a new VM. Then, whichever approach indicates a higher probability may be adopted. Alternatively, or in addition, the potential savings in power afforded by each approach, the complexity of computation demanded, etc., may also be considered.

In an embodiment, scheduler 150 first considers the number of VMs in each of the available nodes. If multiple nodes satisfy the criterion of maximum number of VMs, scheduler 150 may additionally consider resource consumption, similarity in sizes of VMs, etc. in each of the multiple nodes, and selects the 'best' node based on the approaches of FIGS. 4A/4B/4C as well as 5A/5B/5C.

6. Hosting a New VM Based on Geographical Location of a Node

According to yet another aspect of the present invention, hosting of a new VM is based on power tariffs applicable in the geographical locations (e.g., cities) in which nodes/data centers are located. FIG. 6A shows the contents of a table maintained in scheduler 150 prior to scheduler 150 determining that a new VM needs to be provisioned. Nodes 140A and 140B, being housed in the same data center (130A), are located in the same geographical region "PP", where the power tariff is assumed to be $5/unit of power consumed. Node 140Z, housed in data center 130B, is assumed to be located in a geographical area "QQ" where the power tariff is $1/unit. Node 140A hosts VMs 601, 602, 603 and 604 with respective resource consumptions of 10%, 20%, 20% and 10%. Node 140B hosts VMs 611 and 612 with respective resource consumptions of 40% and 50%. Node 140Z hosts VM 621 with a resource consumption of 20%.

Scheduler 150 provisions a new VM 605 (with resource requirement of 10%) in node 140Z, as shown in the table of FIG. 6B. The goal of the approach is to free (if possible) one or more of nodes 140A and 140B of VMs (by possibly moving the VMs in 140A and/or 140B to lower tariff area "QQ"), and thereby to shut them down (and thus saving power). Thus, according to the approach, a new VM is provisioned in a node located in a lower-tariff area.

Again, the technique illustrated with respect to FIGS. 6A and 6B may be applied in combination with one or more of the techniques noted above (sections 4 and 5 above), based on computed probabilities afforded by each of the individual techniques. Thus, in the example of FIGS. 6A and 6B, new VM 605 may be provisioned in node 140Z (even though the resource utilization of node 140Z is less compared to nodes 140A and 140B located in higher-tariff areas), if the probability that such provisioning provides for eventual freeing of node 140A and 140B from hosting VMs is higher than a probability of freeing node 140Z.

7. Hosting a New VM Based on Customer Usage Patterns

According to yet another aspect of the present invention, hosting of a new VM is based on usage patterns of customers requesting services from nodes in a cluster. In the embodiment, scheduler 150 maintains information specifying the number of VMs that are (expected to be) required for each customer for corresponding future time durations (e.g., months). Scheduler 150 may obtain such information from a database in one or more of the nodes in grid 130, the information being stored in the database based, for example, on service-level agreements (SLA) for each customer. Alternatively, potential future usage patterns (indicating number of VMs required for a customer) may be determined by scheduler 150 (or another component in grid 130) based on past history of VM requirements of a customer.

Scheduler 150 maintains information indicating the number of VMs required by a customer, as shown in the example table of FIG. 7A. The information of the table of FIG. 7A indicates that customer C1 expects a requirement of 25 VMs for the months March through June, 26 VMs for the months July through November, and 5 VMs for the months December through February. Scheduler 150 schedules the corresponding VMs required by customer C1 to be hosted in node 140A.

Customer C2 expects a requirement of 16 VMs for the months March through June, 14 VMs for the months July through November, and 13 VMs for the months December through February. Scheduler 150 schedules the corresponding VMs required by customer C2 to be hosted in node 140B. Customer C3 expects a requirement of 9 VMs for the months March through June, 15 VMs for the months July through November, and 19 VMs for the months December through February. Scheduler 150 schedules the corresponding VMs required by customer C3 to be hosted in node 140Z.

Assume now that scheduler 150 needs to provision a new VM (e.g., for customer C2) in the month of November. Scheduler 150 provisions the new VM in node 140B, based on the knowledge that node 140A will need to host only five VMs through the months of December through February, thereby offering the possibility of migrating the five VMs from node 140A to another node and hence shutting down node 140A. The new VM is indicated in FIG. 7B as being provisioned in node 140B by the entry (14+1) (the '1' indicating the new VM provisioned) against column July-November in FIG. 7B. It is assumed that node 140B has sufficient spare resources to host the additional (new) VM.

At a subsequent time instance (e.g., starting in the month of December), scheduler 150 migrates the five VMs required by customer C1 from node 140A to node 140Z (assuming sufficient resources are available in node 140Z to accommodate the five VMs), as shown by the entries for node 140Z for the months December to February. Node 140A may then be powered down for the duration of December to February, thereby reducing power consumption in grid 130.

It may be appreciated that the approaches described above are designed to facilitate the possibility of freeing one or more nodes from hosting VMs and to power down the node(s), thereby reducing power consumption. As noted above, two or more of the different approaches described in sections above may be applied in combination as well. Powering down of the node(s) may be performed, for example, manually or by load balancer 160.

In general, while the various considerations are described in isolation above, each consideration may be provided a weighted average (with the value of weights being used, as suited in the individual environments) and the weighted average computed for each node may be used in selecting the specific node for hosting of a new VM. At least in such a situation, the probability of selection of a node may be either enhanced or reduced due to each consideration.

For example, with respect to the approach of FIGS. 4A-4C, nodes having more resources consumed may be selected with a higher probability, compared to nodes having more unused resources. With respect to the approach of FIGS. 5A-5C, nodes having smaller VMs (i.e., individual VMs using less resources) may be chosen with a higher probability. With respect to the approach of FIGS. 6A and 6B, nodes in regions with lower power tariff may be selected with a higher probability. With respect to the approach of FIGS. 7A and 7B, nodes which would have more VMs at a future time duration, would be selected with a higher probability.

It should be appreciated that the features described above can be implemented in various embodiments as a desired combination of one or more of hardware, software, and firmware. The description is continued with respect to an embodiment in which various features are operative when the software instructions described above are executed.

8. Digital Processing System

Figure 8:
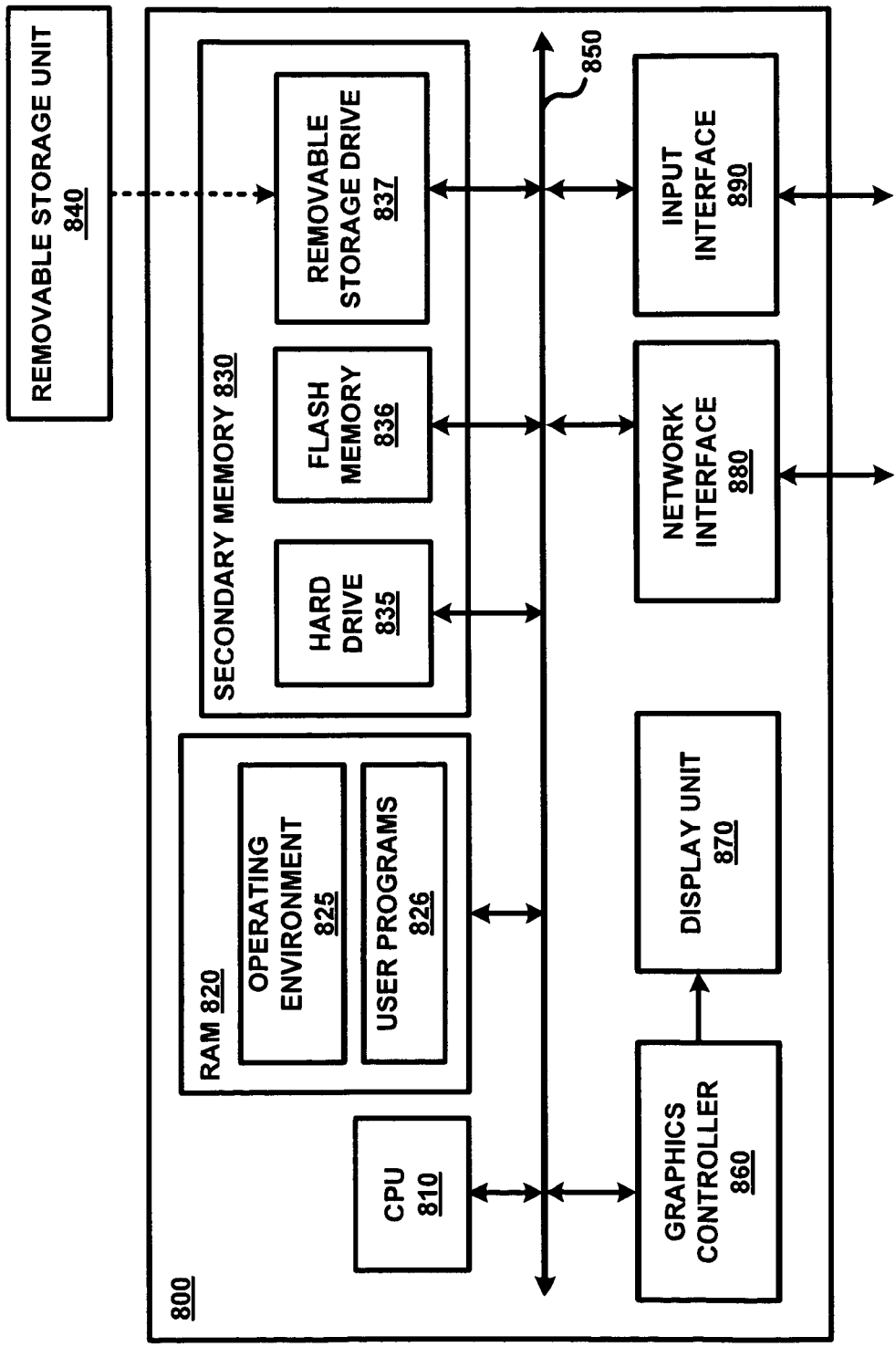
FIG. 8 is a block diagram illustrating the details of a digital processing system in which various aspects of the present invention are operative by execution of appropriate software instructions.

FIG. 8 is a block diagram illustrating the details of digital processing system 800 in which various aspects of the present invention are operative by execution of appropriate software instructions. Digital processing system 800 may correspond to scheduler 150 (as well as any of the server systems of grid 130).

Digital processing system 800 may contain one or more processors such as a central processing unit (CPU) 810, random access memory (RAM) 820, secondary memory 830, graphics controller 860, display unit 870, network interface 880, and input interface 890. All the components except display unit 870 may communicate with each other over communication path 850, which may contain several buses as is well known in the relevant arts. The components of FIG. 8 are described below in further detail.

CPU 810 may execute instructions stored in RAM 820 to provide several features of the present invention. CPU 810 may contain multiple processing units, with each processing unit potentially being designed for a specific task. Alternatively, CPU 810 may contain only a single general-purpose processing unit.

RAM 820 may receive instructions from secondary memory 830 using communication path 850. RAM 820 is shown currently containing software instructions constituting operating environment 825 and/or user programs 826 (such as client applications, Web browser, application instances processing user requests, etc.). The operating environment contains utilities shared by user programs, and such shared utilities include operating system, device drivers, virtual machines, etc., which provide a (common) run time environment for execution of user programs/applications.

Graphics controller 860 generates display signals (e.g., in RGB format) to display unit 870 based on data/instructions received from CPU 810. Display unit 870 contains a display screen to display the images defined by the display signals. Input interface 890 may correspond to a keyboard and a pointing device (e.g., touch-pad, mouse) and may be used to provide inputs. Network interface 880 provides connectivity to a network (e.g., using Internet Protocol), and may be used to communicate with other systems connected to the network (for example by connecting to path 135 of FIG. 1).

Secondary memory 830 may contain hard drive 835, flash memory 836, and removable storage drive 837. Secondary memory 830 may store data (for example, the tables of FIGS. 4A, 4B, 4C, 5A, 5B, 5C, 6A, 6B, 7A and 7B) and software instructions, which enable digital processing system 800 to provide several features in accordance with the present invention.

Some or all of the data and instructions may be provided on removable storage unit 840, and the data and instructions may be read and provided by removable storage drive 837 to CPU 810. Floppy drive, magnetic tape drive, CD-ROM drive, DVD Drive, Flash memory, removable memory chip (PCMCIA Card, EPROM) are examples of such removable storage drive 837.

Removable storage unit 840 may be implemented using medium and storage format compatible with removable storage drive 837 such that removable storage drive 837 can read the data and instructions. Thus, removable storage unit 840 includes a computer readable (storage) medium having stored therein computer software and/or data. However, the computer (or machine, in general) readable medium can be in other forms (e.g., non-removable, random access, etc.).

In this document, the term "computer program product" is used to generally refer to removable storage unit 840 or hard disk installed in hard drive 835. These computer program products are means for providing software to digital processing system 800. CPU 810 may retrieve the software instructions, and execute the instructions to provide various features of the present invention described above.

Reference throughout this specification to "one embodiment", "an embodiment", or similar language means that a particular feature, structure, or characteristic described in connection with the embodiment is included in at least one embodiment of the present invention. Thus, appearances of the phrases "in one embodiment", "in an embodiment" and similar language throughout this specification may, but do not necessarily, all refer to the same embodiment.

Furthermore, the described features, structures, or characteristics of the invention may be combined in any suitable manner in one or more embodiments. In the above description, numerous specific details are provided such as examples of programming, software modules, user selections, network transactions, database queries, database structures, hardware modules, hardware circuits, hardware chips, etc., to provide a thorough understanding of embodiments of the invention.

9. Conclusion

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

It should be understood that the figures and/or screen shots illustrated in the attachments highlighting the functionality and advantages of the present invention are presented for example purposes only. The present invention is sufficiently flexible and configurable, such that it may be utilized in ways other than that shown in the accompanying figures.

Further, the purpose of the following Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the present invention in any way.

What is claimed is:

1. A method of reducing power consumption in a grid containing a plurality of nodes, said plurality of nodes used for hosting virtual machines (VM), said method comprising:
    determining that a new virtual machine (VM) is to be hosted in said grid;
    selecting a node to host said new VM, according to an approach designed to minimize power consumption in said grid, said node being comprised in said plurality of nodes; and
    provisioning said new VM on the selected node,
    wherein said selecting according to said approach comprises:
        determining a first node as said node, wherein said first node has a maximum resource consumption among said plurality of nodes at the time of said selecting, wherein resource consumption in each of nodes is measured based on extent of usage of memory and processing resources in the node,
        wherein said selecting selects said first node to provision said new VM by virtue of said maximum resource consumption within said first node, and
        wherein said first node has sufficient resources for hosting said new VM at the time of said selecting.

2. A method of reducing power consumption in a grid containing a plurality of nodes, said plurality of nodes used for hosting virtual machines (VM), said method comprising:
    determining that a new virtual machine (VM) is to be hosted in said grid;
    selecting a node to host said new VM, according to an approach designed to minimize power consumption in said grid, said node being comprised in said plurality of nodes; and
    provisioning said new VM on the selected node,
    wherein said selecting according to said approach comprises:
        determining a first node which is hosting smaller-sized VMs than a second node when said selecting is to be performed, wherein said first node and said second node are contained in said plurality of nodes,
        wherein said selecting selects said first node with a higher probability than said second node, by virtue of hosting smaller sized VMs, to provision said-new VM, and
        wherein said first node has sufficient resources for hosting said new VM at the time of said selecting.

3. The method of claim 2, wherein said determining determines that another VM is to be hosted in said grid,
    wherein said selecting further comprises:
    determining a third node located in a geographical area having lower power tariff than a geographical location having a fourth node, said third node and said fourth node being contained in said plurality of nodes,
    wherein said selecting selects said third node with a higher probability than said fourth node to provision said another VM, and
    wherein said first node has sufficient resources for hosting said another VM at the time of said selecting.

4. A method of reducing power consumption in a grid containing a plurality of nodes, said plurality of nodes used for hosting virtual machines (VM), said method comprising:
    determining that a new virtual machine (VM) is to be hosted in said grid;
    selecting a node to host said new VM, according to an approach designed to minimize power consumption in said grid, said node being comprised in said plurality of nodes; and
    provisioning said new VM on the selected node,
    wherein said selecting according to said approach comprises:
        maintaining information specifying a future time duration in which a first VM, which is hosted on a first node when said selecting is to be performed, can be terminated,
        wherein said information further indicates that VMs, presently hosted on a second node when said selecting is to be performed, need not be terminated at or before said future time duration,
        wherein said selecting selects said second node with a higher probability than said first node to provision said new VM, and
        wherein both of said first node and said second node have sufficient resources for hosting said new VM at the time of said selecting.

5. A non-transitory machine readable medium storing one or more sequences of instructions for enabling a scheduler system to reduce power consumption in a grid, wherein execution of said one or more sequences of instructions by one or more processors contained in said scheduler system causes said scheduler system to perform the actions of:
    determining that a new virtual machine (VM) is to be hosted in said grid;
    selecting a node to host said new VM, according to an approach designed to minimize power consumption in said grid, said node being comprised in a plurality of nodes; and
    provisioning said new VM on the selected node,
    wherein said selecting according to said approach comprises:
        determining a first node as said node, wherein said first node has a maximum resource consumption among said plurality of nodes at the time of said selecting, wherein resource consumption in each of nodes is measured based on extent of usage of memory and processing resources in the node,
        wherein said selecting selects said first node to host said new VM by virtue of said maximum resource consumption within said first node, and
        wherein said first node has sufficient resources for hosting said new VM at the time of said selecting.

6. The non-transitory machine readable medium of claim 5, wherein said selecting further comprises:
    determining a third node located in a geographical area having lower power tariff than a geographical location having a fourth node, said third node and said fourth node being contained in said plurality of nodes, wherein said selecting selects said third node with a higher probability than said fourth node to host said new VM, and wherein said third node has sufficient resources for hosting said new VM at the time of said selecting.

7. The non-transitory machine readable medium of claim 5, wherein said selecting according to said approach comprises:

maintaining information specifying a corresponding number of VMs required on each of said plurality of nodes in a future time duration, wherein said information specifies that a second node requires fewer VMs compared to that required on a third node, wherein said selecting selects said third node with a higher probability compared to said second node to provision said new VM.

8. A non-transitory machine readable medium storing one or more sequences of instructions for enabling a scheduler system to reduce power consumption in a grid, wherein execution of said one or more sequences of instructions by one or more processors contained in said scheduler system causes said scheduler system to perform the actions of:

determining that a new virtual machine (VM) is to be hosted in said grid;

selecting a node to host said new VM, according to an approach designed to minimize power consumption in said grid, said node being comprised in a plurality of nodes; and provisioning said new VM on the selected node, wherein said selecting according to said approach comprises:

determining a first node which is hosting smaller-sized VMs than a second node when said selecting is to be performed, wherein said first node and said second node are contained in said plurality of nodes, wherein said selecting selects said first node with a higher probability than said second node, by virtue of hosting smaller sized VMs, to host said new VM, and wherein said first node has sufficient resources for hosting said new VM at the time of said selecting.

9. A non-transitory machine readable medium storing one or more sequences of instructions for enabling a scheduler system to reduce power consumption in a grid, wherein execution of said one or more sequences of instructions by one or more processors contained in said scheduler system causes said scheduler system to perform the actions of:

determining that a new virtual machine (VM) is to be hosted in said grid;

selecting a node to host said new VM, according to an approach designed to minimize power consumption in said grid, said node being comprised in a plurality of nodes; and provisioning said new VM on the selected node, wherein said selecting according to said approach comprises:

maintaining information specifying a future time duration in which a first VM, which is hosted on a first node when said selecting is to be performed, can be terminated, wherein said information further indicates that VMs, presently hosted on a second node when said selecting is to be performed, need not be terminated at or before said future time duration, wherein said selecting selects said second node with a higher probability than said first node to host said new VM, and wherein both of said first node and said second node have sufficient resources for hosting said new VM at the time of said selecting.

10. A grid comprising:
a plurality of nodes; and
a scheduler system operable to:
  determine that a new virtual machine (VM) is to be hosted in said grid;
  select a node to host said new VM, according to an approach designed to minimize power consumption in said grid, said node being comprised in said plurality of nodes; and
  provision said new VM on the selected node,
to perform said select, wherein said scheduler system is further operable to:
  determine a first node as said node, wherein said first node has a maximum resource consumption among said plurality of nodes at the time of said select, wherein resource consumption in each of nodes is measured based on extent of usage of memory and processing resources in the node,
  wherein said select selects said first node to host said new VM by virtue of said maximum resource consumption within said first node, and
  wherein said first node has sufficient resources for hosting said new VM at the time of said select.

11. A grid comprising:
a plurality of nodes; and
a scheduler system operable to:
  determine that a new virtual machine (VM) is to be hosted in said grid;
  select a node to host said new VM, according to an approach designed to minimize power consumption in said grid, said node being comprised in said plurality of nodes; and
  provision said new VM on the selected node,
to perform said select, wherein said scheduler system is further operable to:
  determine a first node which is hosting smaller-sized VMs than a second node when said selecting is to be performed, wherein said first node and said second node are contained in said plurality of nodes,
  wherein said select selects said first node with a higher probability than said second node, by virtue of hosting smaller sized VMs, to host said new VM, and
  wherein said first node has sufficient resources for hosting said new VM at the time of said select.

12. A grid comprising:
a plurality of nodes; and
a scheduler system operable to:
  determine that a new virtual machine (VM) is to be hosted in said grid;
  select a node to host said new VM, according to an approach designed to minimize power consumption in said grid, said node being comprised in said plurality of nodes; and
  provision said new VM on the selected node,
to perform said select, wherein said scheduler system is further operable to:
  maintain information specifying a future time duration in which a first VM, which is hosted on a first node when said select is to be performed, can be terminated,
  wherein said information further indicates that VMs, presently hosted on a second node when said select is to be performed, need not be terminated at or before said future time duration, wherein said select selects said second node with a higher probability than said first node to host said new VM, and wherein both of said first node and said second node have sufficient resources for hosting said new VM at the time of said select.

13. The grid of claim 12, to perform said select, wherein said scheduler system is further operable to:

determine a third node located in a geographical area having lower power tariff than a geographical location having a fourth node, said third node and said fourth node being contained in said plurality of nodes, wherein said select selects said third node with a higher probability than said fourth node to host said new VM, and wherein said third node has sufficient resources for hosting said new VM at the time of said selecting.

14. A grid comprising:

a plurality of nodes; and a scheduler system operable to:

determine that a new virtual machine (VM) is to be hosted in said grid;

select a node to host said new VM, according to an approach designed to minimize power consumption in said grid, said node being comprised in said plurality of nodes; and provision said new VM on the selected node, to perform said select, wherein said scheduler system is further operable to:

maintain information specifying a corresponding number of VMs required on each of said plurality of nodes in a future time duration, wherein said information specifies that a first node requires fewer VMs compared to that required on a second node, wherein said selecting selects said second node with a higher probability compared to said first node to provision said new VM.

15. A method of reducing power consumption in a grid containing a plurality of nodes, said plurality of nodes used for hosting virtual machines (VM), said method comprising:

determining that a new virtual machine (VM) is to be hosted in said grid;

selecting a node to host said new VM, according to an approach designed to minimize power consumption in said grid, said node being comprised in said plurality of nodes; and provisioning said new VM on the selected node, wherein said selecting according to said approach comprises:

maintaining information specifying a corresponding number of VMs required on each of said plurality of nodes in a future time duration, wherein said information specifies that a first node requires fewer VMs compared to that required on a second node, wherein said selecting selects said second node with a higher probability compared to said first node to provision said new VM.

* * * * *